No. 732,018. PATENTED JUNE 23, 1903.
J. J. WISEMAN.
BUTTER FOR HARVESTERS.
APPLICATION FILED SEPT. 11, 1901.
NO MODEL. 2 SHEETS—SHEET 1.

WITNESSES:
William P. Goebel
J. Fed Acker

INVENTOR
John J. Wiseman
BY Munn & Co.
ATTORNEYS

No. 732,018. PATENTED JUNE 23, 1903.
J. J. WISEMAN.
BUTTER FOR HARVESTERS.
APPLICATION FILED SEPT. 11, 1901.
NO MODEL. 2 SHEETS—SHEET 2.
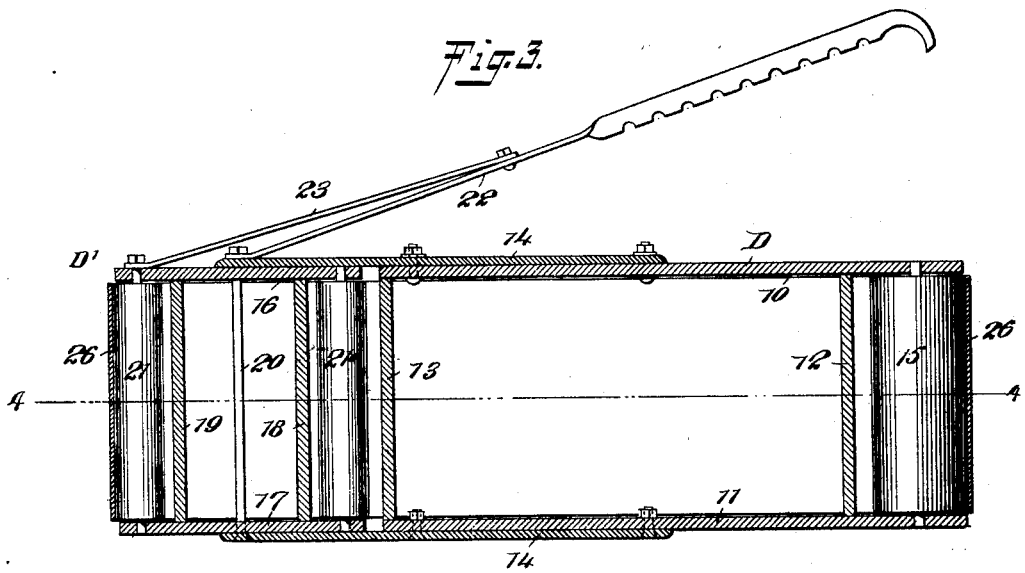
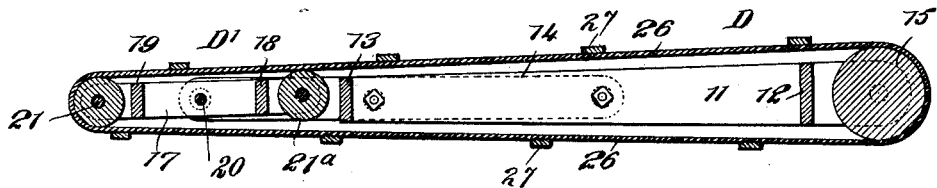
WITNESSES:
William P. Goebel
J. Fred. Acker
INVENTOR
John J. Wiseman
BY Munn & Co.
ATTORNEYS No. 732,018. Patented June 23, 1903.

UNITED STATES PATENT OFFICE.

JOHN JAMES WISEMAN, OF WUNGHNU, VICTORIA, AUSTRALIA.

BUTTER FOR HARVESTERS.

SPECIFICATION forming part of Letters Patent No. 732,018, dated June 23, 1903.

Application filed September 11, 1901. Serial No. 75,103. (No model.)

*To all whom it may concern:*

Be it known that I, JOHN JAMES WISEMAN, a subject of the King of Great Britain, and a resident of Wunghnu, Victoria, Australia, have invented a new and Improved Butter for Harvesters, of which the following is a full, clear, and exact description.

The purpose of the invention is to provide a butter for harvesters which is constructed in two sections—a main or feed section and a butt-alining section—and, further, to provide means for adjusting the butter in such manner that the alining-section no matter in what position the butter is placed will be parallel with the packers and will produce a straight butt for the sheaf whether the grain be long or short.

A further purpose of the invention is to so construct a butter for harvesters that it will materially assist in keeping the binding-table clear, thus preventing the grain choking between the rollers and packers of the harvester.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
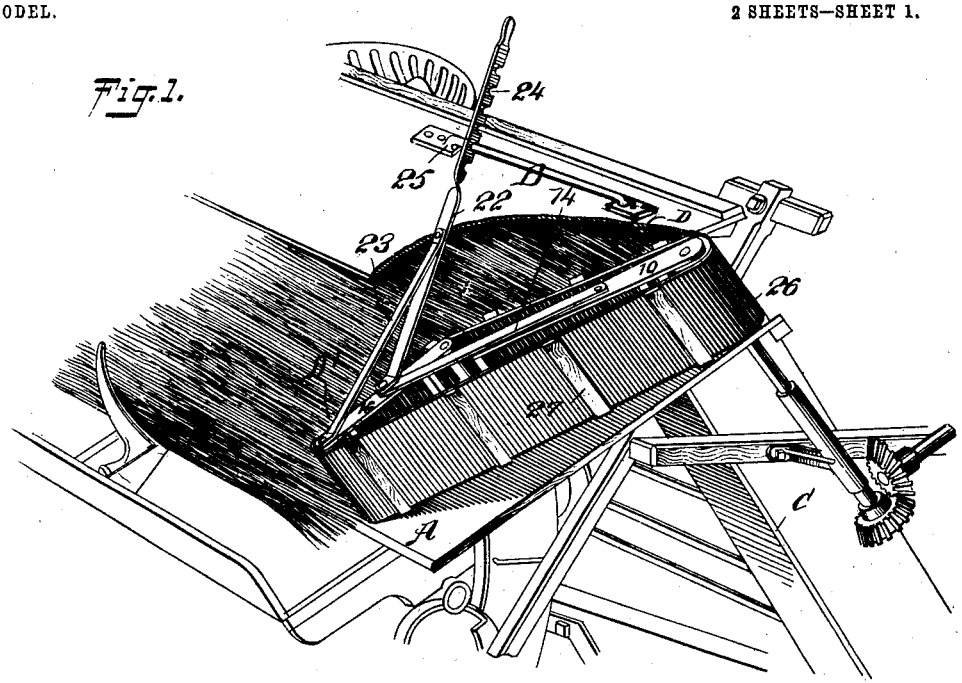
Figure 2:
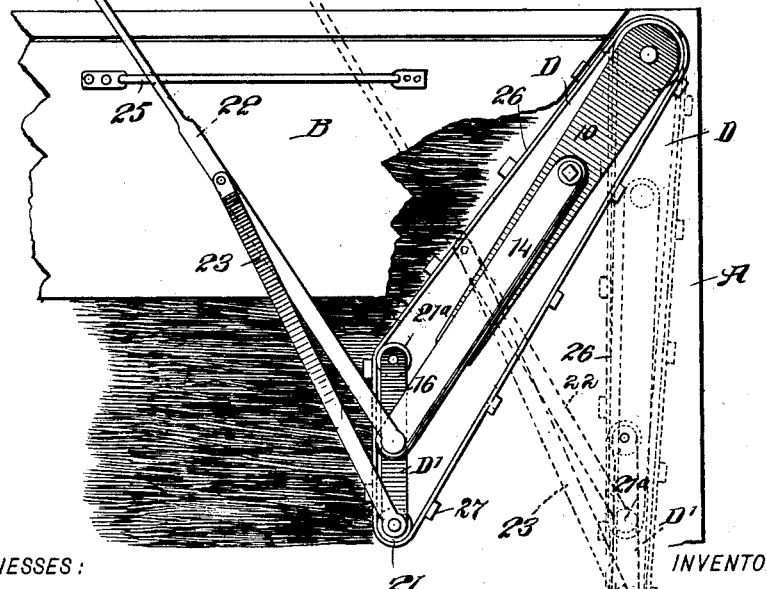

Figure 1 is a perspective view of a portion of the binding-table of a harvester and the improved butter applied. Fig. 2 is a plan view of a portion of the binding-table of the harvester and the improved butter, the latter being shown in two positions. Fig. 3 is a longitudinal vertical section through the butter, and Fig. 4 is a horizontal section taken practically on the line 4 4 of Fig. 3.

A represents a portion of the binding-table of a harvester, B a partial cover for said table, and C the elevator, by means of which the cut grain is carried to the binding-table. The butter is located at the forward portion of the binding-table transversely thereof, yet the said butter is capable of assuming a diagonal position forward or rearward, as occasion may demand. This butter is made in two sections—a main or feed section D and a butt-alining section D'. The frame of the main or feed section consists of an upper bar 10, a lower bar 11, and vertical connecting-bars 12 and 13, the bar 12 being located near one end of the said section and the bar 13 at the opposite end, and that end of the section near which the connecting-bar 12 is located is adapted to be pivotally connected with the binding-table in any suitable manner.

In the further construction of the frame of the feed or main section D of the butter straps 14 are secured to the upper and lower portions of the upper and lower bars 10 and 11 of the frame, and these straps extend any desired distance beyond the connecting-bar 13. At the pivot end of the main or feed section of the butter a roller 15 is mounted to turn, being vertically located in the frame. The frame of the butt-alining section D' is not as long as the frame of the main or feed section, and the frame of the butt-alining section D' of the butter consists of a top bar 16, a bottom bar 17, and vertical connecting-bars 18 and 19, located at each side of the center of the top and bottom bars. The frame of the butt-alining section of the butter is centrally pivoted upon a rod 20, which rod is attached to the straps 14 of the main section, and at the end portions of the butt-alining section of the butter rollers 21 and 21ª are vertically placed, being mounted to freely turn either on trunnions or on rods which are passed through the rollers.

A handle 22 is pivoted upon the upper end of the pivoting-rod 20, and this handle is usually provided at its outer end with notches 24, adapted to engage with a keeper 25, located on the partial cover B of the binding-table, as shown in Fig. 1 and 2, and a rod 23 is pivotally attached at one end to the handle 22 and is likewise pivotally attached at the opposite end to the trunnion or spindle of the roller 21, for example, so that by moving the handle 22 forward or rearward the butter is moved along the binding-table, and owing to the link or rod connection 23 between the butt-alining section of the butter and the handle 22 the said butt-alining section will move at all times practically parallel to the packers of the harvester, or so that the said butt-alining section will present a practically straight face to the butts of the grain—that is to say, the butt-alining section D' of the butter moves substantially parallel with a line drawn transversely through the binding-table, and by reason of the adjustment of the butt-alining section D', shown in two positions in Fig. 2, the butter may be quickly placed in position for use in connection with long or short grain, insuring the butts of the sheaf being perfectly even.

An endless belt 26 is passed around the rollers 15, 21, and 21ª, and this endless belt is provided with vertical slats 27, as shown in Figs. 1 and 2, and that portion of the belt which extends from the pivoted end of the main section of the butter to a connection with the main portion of the alining-section serves to feed the grain along the binding-table to a position in front of the alining-section, or to a position where the sheaf can be conveniently formed.

This device is exceedingly simple, effective, and durable and may be readily applied to the binding-table of any harvester.

Having thus described my invention, I claim as new and desire to secure by Letters Patent—

1. A butter for harvesters, consisting of a feed-section provided with a roller, a butt-alining section pivotally connected intermediate of its ends with the feed-section and provided with rollers at its ends, an endless belt passed to an engagement with all of the rollers, a shifting handle pivotally connected with the feed-section, and a link connection between the shifting handle and the butt-alining section of the butter, for the purpose described.

2. In a butter for harvesters, the combination, with a frame adapted to be pivoted at one end and having extensions at its opposite end, and a roller mounted to turn at the pivoted end of the said main section, of a butt-alining section, consisting of a frame pivotally attached at its center to the extensions from the main frame, rollers mounted to turn at each end of the frame of the butt-alining section, a handle pivoted on one of the extensions of the main frame, a link pivotally attached to the said handle and to an outer portion of the frame of the butt-alining section of the butter, and an endless belt engaging with all of the said rollers, for the purpose specified.

In testimony whereof I have signed my name to this specification in the presence of two subscribing witnesses.

JOHN JAMES WISEMAN.

Witnesses:
CHARLES HARKETT,
W. W. BILL.